Aug. 16, 1949.                H. K. ISHLER                2,478,969
            ELECTRON TUBE MOUNT STABILIZER SUPPORT
                      Filed July 19, 1944
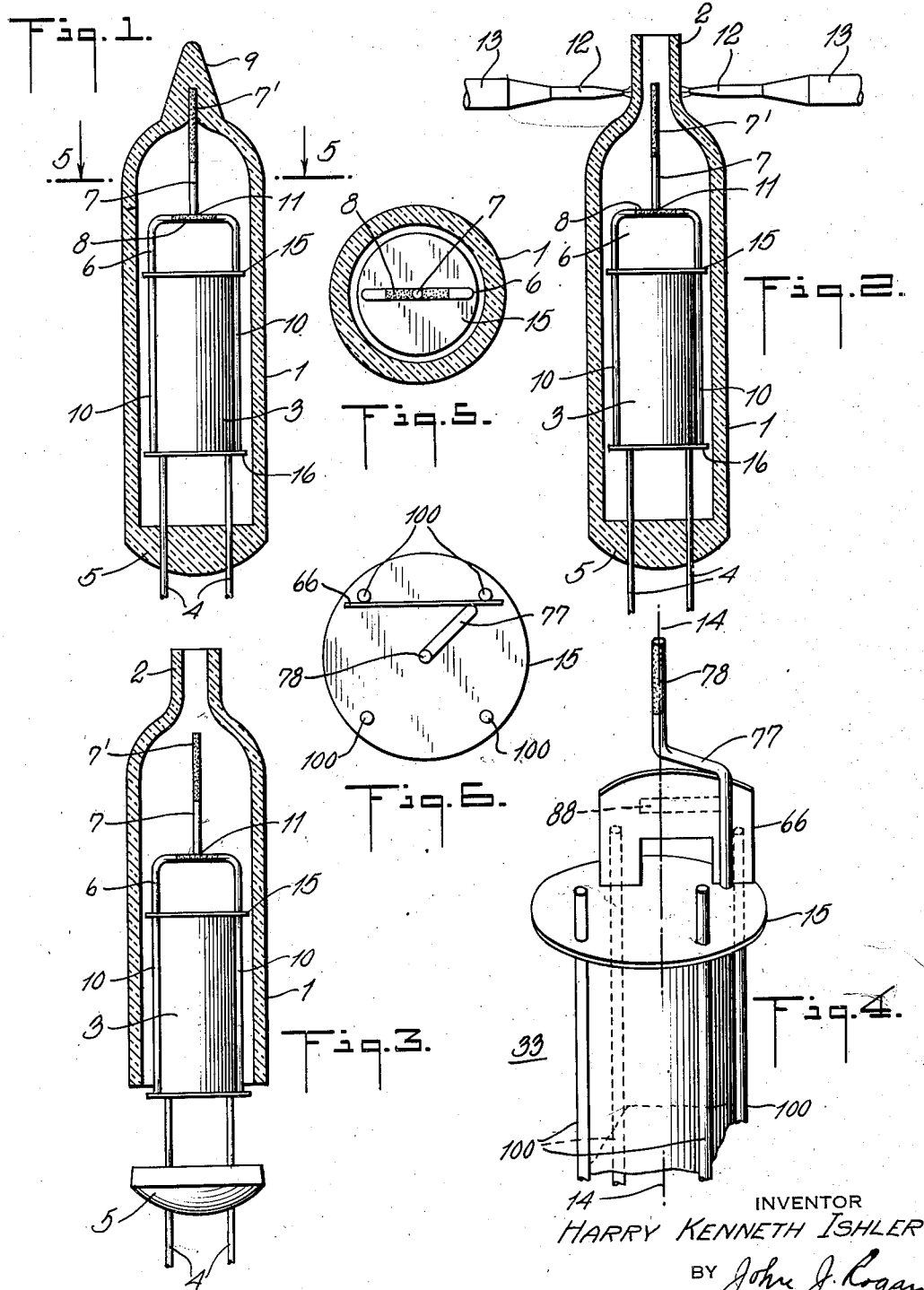
INVENTOR
HARRY KENNETH ISHLER
BY John J. Rogan
ATTORNEY

UNITED STATES PATENT OFFICE 2,478,969

ELECTRON TUBE MOUNT STABILIZER SUPPORT

Harry Kenneth Ishler, Emporium, Pa., assignor to Sylvania Electric Products Inc., Emporium, Pa., a corporation of Massachusetts Application July 19, 1944, Serial No. 545,592

4 Claims. (Cl. 250—27.5)

This invention relates to electron discharge devices and more particularly to shock absorbing supports for the electrode assembly of such tubes.

In many electron discharge tubes, such as radio tubes and the like, the electrode mount is substantially supported at one end from a stem or header, to which it is rigidly connected by means of sealed-in metal wires or rods, part or all of which also serve as lead-in conductors for making external circuit connections with the electrodes in the envelope. This leaves the other end of the mount subject to displacements from its desired position with respect to the tube envelope in response to mechanical shock. It is, therefore, necessary to prevent motions of this free end of the mount with respect to the tube envelope by using auxiliary supporting and spacing members so as to keep the mount as a whole centered in the envelope. This objective is usually attained by providing a plurality of elastic wire clips, metal springs, or resilient parts made of other suitable material, which are attached to the upper end of the mount and engage the cylindrical wall of the envelope at several points, thus establishing radially acting forces to prevent change of position of the upper end of the mount from its central position in the envelope. Mount supports of this type are illustrated and described, e. g., in the patents: 2,049,164, issued to M. I. Kahl on July 28, 1936; 2,111,002, issued to G. D. O'Neill on March 15, 1938; 2,178,836, issued to W. L. Krahl on November 7, 1939.

The common feature of all these auxiliary top supports and spacers is the cooperation of a plurality of rigid but flexible elements acting in radial directions between the cylindrical tube wall and the mount which offer elastic forces whose resultant tends to restore any deviation of the location of the upper mount end from its central position. While these supporting elements fulfill their purpose as such, they have a number of undesirable features. One of them is the fact that they offer friction to the tube envelope when the envelope is slipped over the mount structure before sealing-in and exhaust of the tube. Furthermore, the shape and size of these elastic spacing members, and their angular positions on the tube mount must be carefully matched so as to insure an equilibrium of the cooperating restoring forces when the mount is in its desired centered axial position in the envelope. In most cases these support members must be specially shaped and formed and the mount itself must be equipped with means for establishing convenient joints with the spacing elements, such as cutouts in the conventional top micas or in the electrodes themselves.

It is, therefore, a principal object of the invention to provide a top supporting member for the electrode mount of an electron discharge tube which is free from the above-noted, and other disadvantages.

One object of the invention relates to a mount stabilizer which offers no friction to the tube envelope when the bulb is slipped over the tube mount before sealing-in.

According to another object of the invention means are provided for centering the tube mount in the envelope, which means do not depend on the perfect balancing of a plurality of radial forces between the mount and the tube envelope.

A still further object of the invention relates to a mount stabilizing member which is particularly adapted for use in extremely small tubes, and particularly those having bulbs of small tubular cross-section.

A feature of the invention relates to an electron discharge tube having a plurality of lead-in support wires on one end and an exhaust tubulation tip on the other end, in which the tip-off seal is instrumental in centering and stabilizing the end of the tube mount at the end near the tip-off seal.

Another feature of the invention relates to the method of sealing-off an exhaust tubulation which insures uniformity of tip-off length from tube to tube.

According to another object of the invention, means are provided to reinforce the tip-off seal of an electron discharge tube.

One feature of the invention relates to a mount stabilizing and centering element which assists in preheating the exhaust tubulation prior to the sealing-off step.

A still further feature of the invention relates to a method of centering and stabilizing a tube mount in an envelope which permits a free longitudinal motion of the tube mount with respect to the envelope during sealing-in.

According to one object of the invention, means are provided to combine the functions of mount stabilizer, centering-spacer, and getter support in a single element.

The invention will now be described with the drawing in which,

Fig. 1 is a side view of the finished tube according to one embodiment of the invention.

Fig. 2 is a side view of the same tube after exhaust and at the beginning of the sealing-off operation.

Fig. 3 is a side view of this tube prior to the sealing-in operation, showing the introduction of the electrode mount into the envelope prior to sealing-in.

Fig. 4 is a perspective view of the top of the electrode mount according to another embodiment of the invention.

Fig. 5 is a sectional view of Fig. 1 along line 5—5.

Fig. 6 is a top-plan view of Fig. 4.

Referring now to Fig. 1, numeral 1 represents a generally cylindrical glass envelope; 3 an elongated tube mount of any well-known construction embodying for example two or more electrodes assembled between upper and lower mica spacer discs 15, 16; numeral 4 represents two of the lead-in conductors which serve as the main support of tube mount 3. Supports 4 are sealed through a header of stem 5 in a vacuum-tight manner. At the top of mount 3, preferably attached by welding to two symmetrical plate supports or side rods 10—10 of the mount is a piece of wire 6 of substantially inverted U-shape. To its center 11 is rigidly connected a short straight piece of wire 7, whose upper end extends into the seal-off tip 9. A "getter" 8 may be attached to the wire loop 6 as shown. A mount insulator spacer 15 is indicated on top of mount 3, as is the lower spacer 16. Centering wire 7 provides a perfect centering means for the upper end of mount 3 with respect to the envelope in exhaust tip 9. There is plenty of clearance between mount 3 and envelope 1, as well as between centering wire 7 and tubulation 2 (Fig. 3) so as to insure completely free motion in axial direction of envelope 1 with respect to mount 3 prior to sealing-in of the tube.

Fig. 2 shows the tube at the end of the exhaust period. The tubulation is just ready for tipping off, as indicated by torches 13 and flames 12. As getter 8 is usually exploded in the preceding exhaust position, centering wire stud 7 is still hot. Its diameter is so chosen that it provides ample clearance inside tubulation 2 so as to present a negligible resistance to the exhaust, but to fit closely enough for preheating of the tubulation along its area near the wire stud 7. During sealing-off, the tip length is automatically controlled by the upper end of stud 7.

Wire member 6 may be made of resilient material so as to provide resiliency parallel to and transverse to member 7, thus providing a shock absorbing action to the transfer of excessive impact into the glass tip in case of mechanical shock. If desired the member 6 may be used as a getter support, which serves as part of a closed induction current path, which path is completed by the plate or another electrode of mount 3. The mount stabilizing and centering element 7 is introduced for a short length into tubulation 2. The centering of the top of the tube mount thus becomes positive, and does not depend on the cooperation and matching of several radial resilient elements between the mount and the wall of the tube.

Fig. 4 is a perspective view of the top of a tube mount according to another embodiment of the invention. In this embodiment, the mount 33 has a box-like shape, and is supported by four vertical support rods 100—100—100—100 joined to the vertical edges of the outermost cylindrical or hollow electrode (e. g., the anode). Attached to two of these supports, above the mount insulator spacer 15, is a metal horseshoe-shaped member 66, which is shown in Fig. 4 as cut out of a piece of metal sheet. Member 66 may be made of wire, if desired, and may carry any well-known getter assembly 88, as indicated.

A wire stud 77 is welded to member 66 near one of the support rods 100 above the mount insulator spacer 15, and is suitably bent so as to have an upper part 78 whose position coincide substantially with the central axis 14—14 of the mount. The upper end 78 of stud 77 is thus again centrally located, with its main extension in the direction of the mount axis, so as to fit into the tubulation of the envelope (not shown in Fig. 4), exactly as described in the embodiment of Figs. 1–3.

If desired, the lower end of wire stud 77 may also be attached to the mid-point of member 66, and properly bent so as to fit into the tubulation. The ends of member 66 are shown attached to two neighboring supports 100. If desired, it may be attached to two diammetrically opposed supports, and the wire stud 77 may then be attached to the middle part of member 66, and made of a straight piece of wire, as in the first embodiment.

Preferably, but not necessarily, the upper end or tip 7' (Figs. 1–3), or 78 (Fig. 4), is made of a metal or alloy which seals in a vacuum-tight manner to the tubulation 2, for example an alloy as disclosed in application Serial No. 358,476, filed September 26, 1940, Patent #2,369,146 of February 13, 1945.

What I claim is:

1. An electron tube comprising an envelope closed at one end by a header and terminated at the opposite end in a seal-off tip, an electrode assembly within said envelope, connector members for the electrodes sealed through said header, said assembly being supported at one end from said header, and means to center the opposite end of the assembly within the envelope and including a metal bridge carried by the said opposite end of the assembly and having an extension located substantially concentric with the vertical axis of the assembly, the free end of said extension being sealed within said seal-off tip.

2. In combination, a tubular glass envelope closed at its upper end by a seal-off tip and at its lower end by a glass header, an electrode mount supported at its lower end by said glass header, a horseshoe shaped getter carrier extending upward from the upper end of said electrode mount and welded with its two end points to two points of an anode electrode of said electrode mount, a getter attached to the middle leg of said getter carrier, said horseshoe shaped getter carrier forming a closed metallic contour together with said anode electrode and simultaneously forming a rigid connection between the tube mount and a piece of metal wire which extends into the inner part of the seal-off tip and thus centers and stabilizes the upper end of the electrode mount with respect to the glass envelope.

3. The combination according to claim 2, in which the getter carrier consists of a flat piece of sheet metal, whose free legs are attached to two of a plurality of uprights constituting the plate supports, and the piece of metal wire being bent twice, one of its ends being attached to said carrier near one of said uprights, the other extending into the seal-off tip.

4. An electron discharge tube comprising a tubular envelope closed at its lower end by a glass header and terminating at its upper end in a seal-off tip, an electrode mount, and lead-in wires for the electrodes sealed through said glass header, means to support said electrode mount at its lower end by said glass header, means to center the upper end of the electrode mount with respect to the envelope, said centering means including a piece of metal wire attached by connecting means to the upper end of said electron mount, and having an axial end portion sealed and enclosed in said seal-off tip, said connecting means consisting of a horse-shoe shaped metal piece whose ends are welded to two points of the upper end of one of the electrodes of said mount and whose center is welded to said piece of metal wire.

HARRY KENNETH ISHLER.

REFERENCES CITED

The following references are of record in the file of this patent:

UNITED STATES PATENTS

| Number | Name | Date |
| --- | --- | --- |
| 359,951 | Schmellenmeier | May 25, 1943 |
| 1,194,281 | Doane | Aug. 8, 1916 |
| 1,949,396 | Wade | Feb. 27, 1934 |
| 2,087,743 | St. Louis | July 20, 1937 |
| 2,105,507 | Ronci | Jan. 18, 1938 |
| 2,116,672 | Ewest et al. | May 10, 1938 |
| 2,129,849 | Laico | Sept. 13, 1938 |
| 2,160,086 | Ronci et al. | May 30, 1939 |
| 2,414,805 | Fay et al. | Jan. 28, 1947 |

FOREIGN PATENTS

| Number | Country | Date |
| --- | --- | --- |
| 800,574 | France | Jan. 18, 1935 |